United States Patent [19]

Goldman et al.

[11] Patent Number: 4,643,343
[45] Date of Patent: Feb. 17, 1987

[54] CANTILEVERED ARTICLE CARRIER

[75] Inventors: Mark Goldman, Weston; Robert Frank, Andover; Craig Roberts, Amesbury; Norman Jacobs, Andover, all of Mass.

[73] Assignee: Eastern Canvas Products, Inc., Ward Hill, Mass.

[21] Appl. No.: 776,000

[22] Filed: Sep. 13, 1985

[51] Int. Cl.⁴ .............................................. B62J 7/00
[52] U.S. Cl. ................................ 224/275; 224/32 R; 224/39
[58] Field of Search ................... 224/32 A, 275, 30 R, 224/39, 32 R, 36

[56] References Cited

U.S. PATENT DOCUMENTS

| | | | |
|---|---|---|---|
| 3,888,397 | 6/1975 | Koizumi | 224/36 X |
| 3,955,729 | 5/1976 | Montgomery | 224/36 |
| 4,350,361 | 9/1982 | Fujii | 224/32 A X |
| 4,566,617 | 1/1986 | Jackson | 224/39 X |

FOREIGN PATENT DOCUMENTS 528684  5/1954  France .............................. 224/30 R

*Primary Examiner*—Charles E. Phillips
*Assistant Examiner*—Robert M. Petrik
*Attorney, Agent, or Firm*—Wolf, Greenfield & Sacks

[57] ABSTRACT

A cantilevered article carrier assembly for attachment to the underside of the seat of a cycle, particularly a bicycle. A fabric bag is secured to one end of a support arm. A bracket is mounted to the underside of the bicycle seat, and the support arm projects through a slot in the bracket so that the other, free end thereof rests in engagement with the underside of the bicycle seat. A Velcro strap is provided on the bag to secure the bag to the bicycle seat support to tension the support arm about the bracket and to prevent the support arm from sliding out of the bracket. The bag includes a plastic insert which is folded about a perforated hinge into the desired shape to maintain the shape of the bag. The bag may be quickly removed from the bicycle by release of the Velcro strap.

13 Claims, 9 Drawing Figures

4,643,343

CANTILEVERED ARTICLE CARRIER

FIELD OF THE INVENTION

This invention relates generally to article carriers for cycles, and more particularly to a cantilevered article carrier which is removably securable to the underside of a bicycle seat.

BACKGROUND OF THE INVENTION

Over the past ten years, fabric article carriers for bicycles have become very popular amongst cycle enthusiasts, particularly those who engage in bicycle touring. Such carriers tend to be as lightweight as possible so that they do not add extra weight to the bicycle, and they have a zippered opening so that articles placed therein remain dry and secure, yet quickly retrievable. In the past, many such carriers generally were secured to the handlebars, or were supported over the rear wheel of the bicycle, typically on a rear carrier rack. Examples of such carriers adapted to be mounted on the front handlebars are found in U.S. Pat. Nos. 3,955,728; 3,955,727; and 4,066,196. Examples of rear mounted carriers or bicycle panniers are found in U.S. Pat. No. 4,271,996.

A feature that has become popular in recent years, especially in bicycle touring, is the ability for bicycle riders to leave the bicycle and take with them any items carried on the bicycle, both for convenience and for security. In such instances, it is desirable for the article carrier to be quickly and easily removable and replaceable on the bicycle. Thus, the attachment of the carrier to the bicycle should be simple, but secure.

Several problems are associated with the successful development of fabric article carriers which are mounted beneath the seat of bicycle. One problem is that it is difficult to securely mount the carrier to the seat so that it remains firmly in place during riding and does not interfere with the operator's movements. A second problem is that fabric carriers tend to sag under the weight of the items carried therein, so that they tend to interfere with the movement of the rear bicycle wheel. A third problem is that there must be a convenient means provided for quickly and easily securing the carrier to the seat and removing it therefrom.

SUMMARY OF THE INVENTION

This invention relates generally to article carriers which are attachable to the underside of the seat of a cycle. More particularly, the article carrier of this invention successfully overcomes the foregoing obstacles to the use of such article carriers by providing a cantilevered suspension for the fabric bag, by providing a simple but secure mechanism for attaching the article carrier to the underside of the seat. As a result, the article carrier of this invention can carry objects without interfering with the operator and it may be quickly and easily removed from its position beneath the seat for use elsewhere.

In a preferred embodiment, the article carrier of this invention includes a lightweight fabric bag with a zippered opening and a support arm. The bag is suspended from one end of the support arm. A bracket is provided which is attached to a wire frame on the underside of the bicycle seat, and the support arm extends through a slot in the bracket so that the free end of the support arm rests in contact with the underside of the seat. The weight of the bag and its contents apply a torque to one end of the support arm to urge the free end against the underside of the seat. A Velcro strap is wrapped about the support column for the bicycle seat and this strap prevents the support arm from sliding out of the bracket and also tensions the support arm to further urge the free end against the underside of the seat.

A plastic insert is provided for defining and maintaining the shape of the bag, and this insert is hinged at two points by the provision of a plurality of perforations. The insert biases the opening of the bag into an open position to permit one handed operation of the zipper and the insert also provides support for the lower wall of the bag to prevent sagging. In addition, the insert provides the necessary strength to permit the carrying of somewhat heavy objects.

In use, the bracket is first secured to the frame on the underside of the seat, typically by screws. The support arm is then inserted through a slot in the bracket, so that the free end of the support arm rests in contact with the underside of the seat. The weight of the bag applies a torque about the slot in the bracket, driving the free end against the underside of the seat. A Velcro strap is wrapped about the bicycle seat support column to prevent the arm from sliding out of the bracket and to further urge the free end against the underside of the seat. The bag may be quickly and easily removed simply by detaching the Velcro strap and withdrawing the support arm through the slot in the bracket. The zippered opening of the bag may be opened and closed in a known manner using one hand, because of the biasing effect of the hinged, plastic insert.

BRIEF DESCRIPTION OF THE DRAWINGS

The objects, advantages and features of this invention will be more clearly appreciated from the following detailed description when taken in conjunction with the accompanying drawings in which.

DETAILED DESCRIPTION OF THE PREFERRED EMBODIMENT

Figure 1:
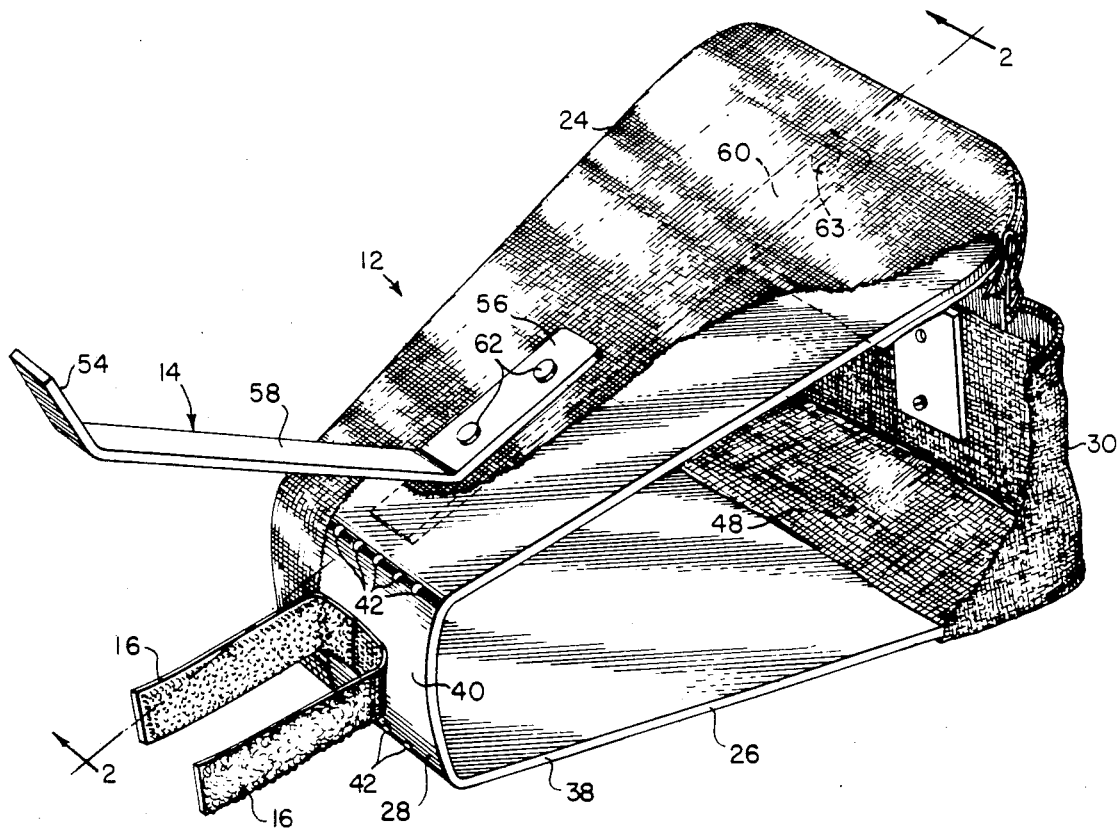
FIG. 1 is a perspective view of the bag of an article carrier in accordance with the present invention.

With reference now to the drawings, and more particularly to FIGS. 1 through 5 thereof, the article carrier 10 of the present invention will now be described. Article carrier 10 typically includes a reinforced bag 12, a support arm 14, Velcro straps 16, and a bracket 18. Article carrier 10 is adapted to be secured to the underside of a bicycle seat 20 supported by a column 22 of a typical bicycle.

Figure 2:
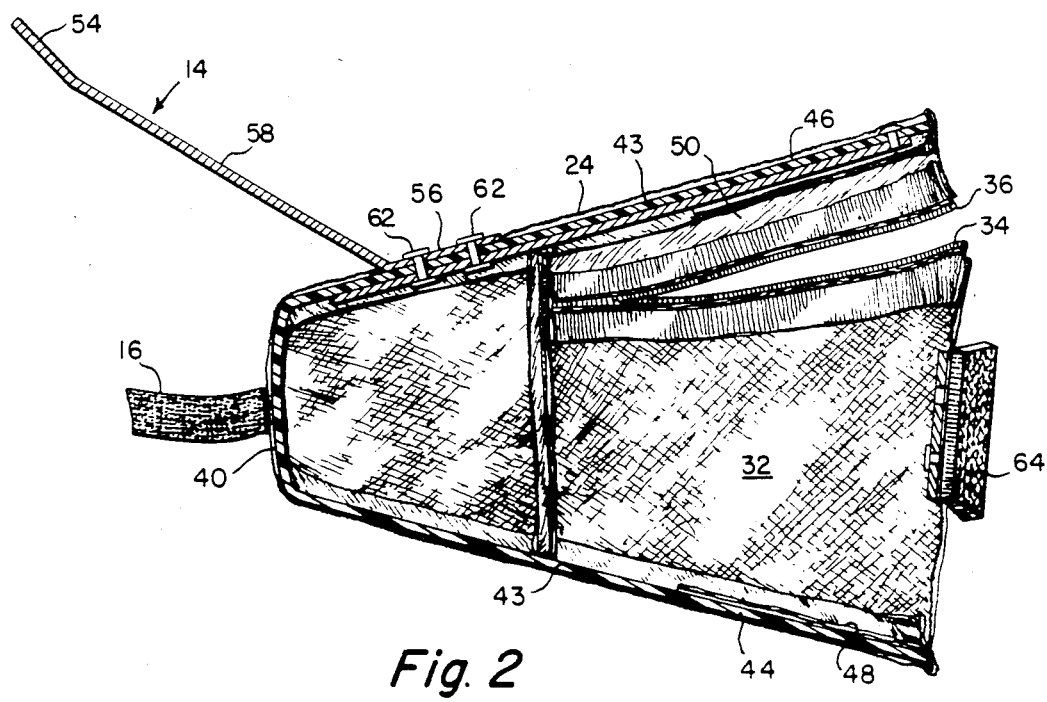
FIG. 2 is a cross-sectional side view taken along the line 2—2 of FIG. 1.

Bag 12 will now be described with particular reference to FIGS. 1 and 2. Bag 12 includes a top wall 24, a bottom wall 26, a rear wall 28, a front wall 30, and two side walls 32. Bag 12 is typically formed of a flexible sheet material, such as canvas, nylon, or some other like fabric. Front wall 30 has an opening 34 which may be opened or closed using a conventional zipper 36 which extends around the perimeter of opening 34. Zipper 36 allows ready access to the interior of the bag and seals the bag when desired. A reflector 64 may be provided on front wall 30, if desired.

Both top wall 24 and bottom wall 26 are typically formed with a generally trapezoidal configuration. Walls 28 and 30 are generally parallel to one another, and side walls 32 are nonparallel. Typically the width of rear wall 28 is less than the width of front wall 30. In this manner, the width of the bag adjacent the operator is less than the width of the bag away from the operator, reducing the likelihood of any interference between the movement of the rider's legs or feet, and the bicycle bag. In addition, the carrying capacity of the bag is maximized by the provision of the larger capacity adjacent front wall 30.

Disposed within bag 12 is a lightweight plastic insert 38 which maintains the rigidity of the bag, strengthens the bag, and maintains and defines its shape. Insert 38 preferably is a continuous sheet of plastic material which has been permanently deformed about hinge 40 into the desired bag shape. Hinge 40 is formed by two generally parallel lines of perforations 42 which extend across the width of insert 38 and which permit bending of the plastic material thereabout. Typically, the free ends of insert 38 extend into fabric pocket 44 in bottom wall 26, and fabric pocket 46 in top wall 24. Pockets 44 and 46 assist in keeping bag 12 and insert 38 in the proper relationship. Pockets 44 and 46 are formed between respective fabric flaps 48 and 50 and respective walls 26 and 28. Insert 38 typically remains exposed within the interior of the bag, except for those portions which extend into pockets 44 and 46.

Hinge 40 has a generally U shape, with the bottom portion of the U defining rear wall 28, and the arms 43 of the U defining walls 24 and 26. Perforations 42 are sufficiently close together along the two lines to permit the necessary bending of insert 38, but perforations 42 are spaced sufficiently to prevent fracturing of insert 38. Hinge 40 is formed at an angle such that the spacing of the arms 43 of the hinge at opening 34 is greater than the dimension of the bag fabric permits. The material of insert 38 and hinge 40 are somewhat resilient so that the arms 43 of insert 38 may be urged together a limited amount to insert them into pockets 44 and 46. Once inside the bag, arms 43 tend to return to their original spacing, pushing walls 24 and 26 outwardly, away from one another. Thus, the fabric of the bag is stretched tightly on insert 38, to define the shape of the bag, and walls 24 and 26, are biased away from one another. As a result, opening 34 is biased into open position, making it possible to operate zipper 36 with one hand without having to hold the opening apart. In addition, the downward movement of bottom wall 26 with respect to wall 24 minimized by the limited flexibility of hinge 40. Thus, insert 38 provides support for bottom wall 26 and prevents excessive sagging of the bag.

Excessive sagging is also prevented by sidewalls 32. Sufficient fabric is provided adjacent opening 34 to limit downward movement of bottom wall 26 with respect to wall 24 and to provide support for wall 26 and the contents of the bag, should zipper 36 be in an open position. Typically, zippered opening 34 extends less than one half the distance from front wall 30 to rear wall 28.

Straps 16 are secured to rear wall 28. Typically, two spaced straps 16 are provided, one strap comprising a female fabric portion of a Velcro fastener with very closely spaced fabric loops, and the other strap comprising a male fabric section of a Velcro fastener with short projecting fibers having hooked ends. Straps 16 are adapted to be wrapped about seat support column 22 so that when the male section is brought into contact with the female section, many of the hooks engage the loops to retain straps 16 in place wrapped tightly about support column 22. In this manner, rear wall 28 is tightly but releasably secured to seat support column 22.

Support arm 14 comprises an upper section 54, a lower section 56, and a middle section 58. Upper section 54 and lower section 56 are both disposed at an obtuse angle with respect to middle section 58. The end of upper section 54 is adapted to be inserted through a slot in bracket 18, as will be described, and to rest in contact with the underside of bicycle seat 20.

A bar 60 is provided on the inside surface of insert 38 along top wall 24. Bar 60 typically extends parallel to lower section 56 of arm 14 from a position adjacent hinge 40 to a position adjacent front wall 30. Lower section 56 of arm 14 is secured directly to top wall 24 and to bar 60 by fastening means, typically rivets 62 which pass from lower section 56, through top wall 24, and to bar 60. At its end closest to front wall 30, bar 60 is also directly secured to insert 38, but not flap 50, and not the fabric of wall 24, by another rivet 63 or other fastening means. Bar 60 both assists in the attachment of arm 14 to top wall 24, and provides strength and rigidity to top wall 24. Also, in this manner, bag 12 is secured to insert 38 to prevent separation thereof or misalignment.

Figure 3:
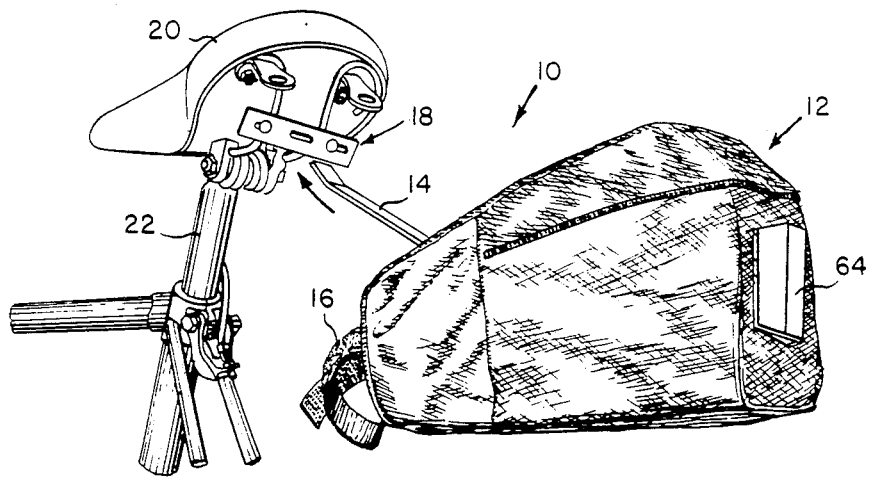
FIG. 3 is a pictorial view of the article carrier of the present invention showing the manner of mounting the article carrier on a bicycle seat.
Figure 4:
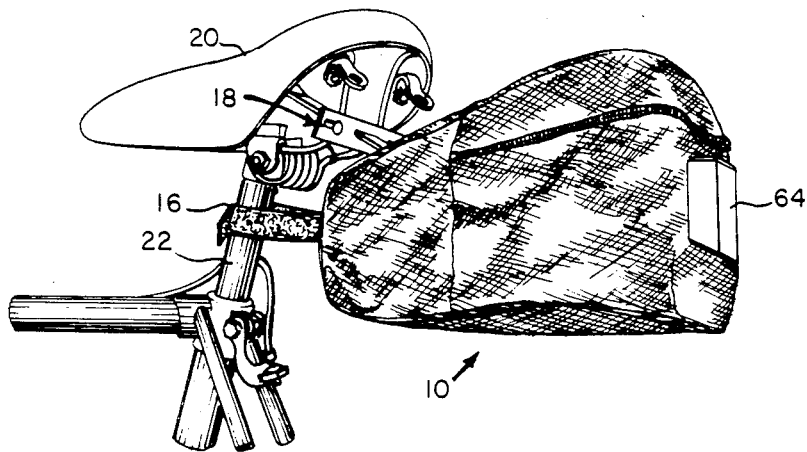
FIG. 4 is a pictorial view of the article carrier of the present invention mounted on a bicycle seat.
Figure 5:
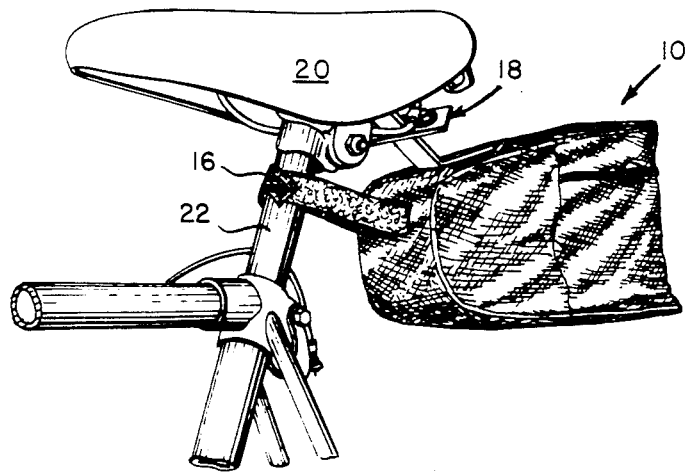
FIG. 5 is the pictorial view of the article carrier of FIG. 4 from a different vantage point.
Figure 6:
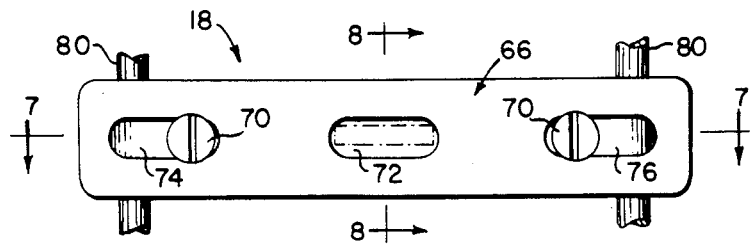
FIG. 6 is a top view of the bracket used to mount the bag of the article carrier of the present invention.
Figure 7:
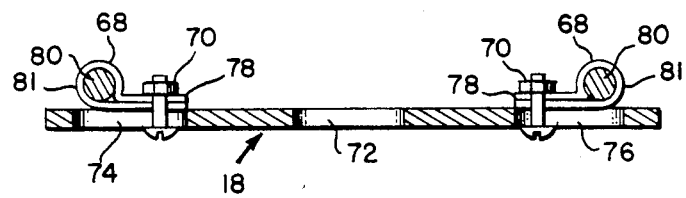
FIG. 7 is a cross-sectional view taken along the line 7—7 of FIG. 6.

Bracket 18 will now be described with particular reference to FIGS. 3, 6 and 7. Bracket 18 includes a face plate 66, two looped members 68, and two fasteners 70, such as a nut and bolt combination. Face plate 66 has three elongated openings 72, 74 and 76. Opening 72 is disposed in the middle of face plate 66, and is of sufficient size and shape to permit upper section 54 and middle section 58 of arm 14 to pass therethrough. However, slot 72 should be sufficiently small that arm 14 is permitted very little lateral or vertical play. Slots 74 and 76 are disposed at opposite ends of face plate 66, and are sufficiently wide to accommodate the threaded portion of fasteners 70, but not the head thereof or the bolt. Slots 74 and 76 are sufficiently elongated so that the position of fasteners 70 with respect to face plate 66 may be adjusted to accommodate different sized bicycle seat frames having different spacings of wire frame sections 80.

Looped members 68 comprise two parallel arms 78 and an adjacent loop 81 formed of a unitary piece of material. Loop 81 is sized to extend around the wire frame section 80 of the frame on the underside of a bicycle seat 20. Wire frame section 80 is passed between arms 78 and into loop 81 to reside therein. Arms 78 are provided with holes through which fasteners 70 can pass, and arms 78 are wider than slots 74 and 76. One looped member 68 is secured to the wire frame section 80 on each side of the underside of seat 20. Each fastener 70 is passed through corresponding slot 74 or 76 and through the corresponding holes in parallel arms 78 to clamp arm 78 against the rear of face plate 66 to secure bracket 18 to frame sections 80 on the underside of seat 20. Typically, looped members 68 are formed of a flexible, plastic material, so that different diameter wire frame sections 80 can be accommodated and secured to face plate 66. By tightly securing arms 78 against face plate 66 and by wrapping loops 81 about wire frame sections 80, face plate 66 is prevented from sliding along wire sections 80, so that the position of bracket 18 is fixed during use.

Figure 8:
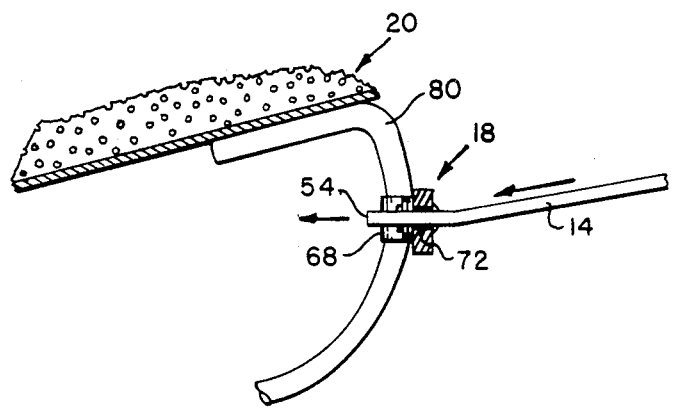
FIG. 8 is a partial cross-sectional view of a bicycle seat showing the insertion of the support arm of the present invention.
Figure 9:
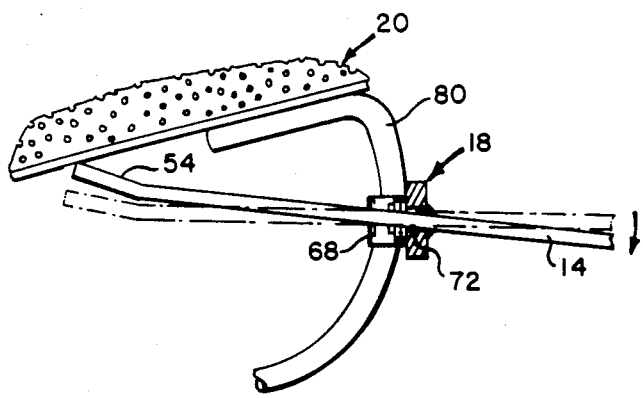
FIG. 9 is a partial cross-sectional view of a bicycle seat showing the support arm of the present invention.

The use and installation of the article carrier 10 of the present invention will now be described with more particular reference to FIGS. 3-5, 8 and 9. Initially, bracket 18 is secured to the underside of bicycle seat 20. Bracket 18 is intended to be secured to wire frame portions 80 on the underside of seat 20, on a more or less permanent basis while the bag 12 is removed or replaced as desired. Typically, bracket 18 is secured at a position on wire frame sections 80 closely adjacent the underside of seat 20, as shown in FIGS. 8 and 9. For each looped member 68, arms 78 are spread apart, and an associated wire frame section 80 is passed therebetween to reside within loop 81. Thereafter, a fastener 70 is passed through corresponding slot 74 or 76, and through the corresponding holes in arms 78 to clamp both arms 78 together, and to clamp arms 78 tightly against the side of face plate 66. Preferably, each looped member 68 is aligned so that loop 81 is positioned closer to the outside edge of face plate 66 than arms 78, as shown in FIG. 7. Fasteners 78 are then positioned at the appropriate points within slots 74 and 76, the position of fasteners 78 being determined by the exact spacing of wire frame sections 80. It is preferred that each fastener 78 be positioned at approximately the same location in its associated slot 74 or 76, so that face plate 66 is centered on seat 20 with respect to wire frame sections 80.

Once bracket 18 has been installed, upper section 54 of arm 14 is passed through slot 72 until the free end of upper section 54 abuts the underside of seat 20, as shown in FIGS. 8 and 9. Thereafter, straps 16 are wrapped about bicycle seat support column 22 and are secured together in a conventional manner using Velcro fasteners. Straps 16 tension bag 12 downwardly with respect to seat 20 to apply a torque on section 56 of arm 14 about slot 72 to drive the end of upper section 54 firmly in contact with the undersurface of seat 20. In this manner, movement of arm 14 or bag 12 with respect to bracket 18 and with respect to the bicycle is prevented. In addition, the weight of the bag and the weight of articles placed in the bag also exert a further downward pull or torque on the lower section 56 of arm 14 to further urge the free end of upper portion 54 into firm engagement with the undersurface of seat 20.

Bag 12 may be quickly and easily removed from bicycle seat 20 merely by unwrapping straps 16 from each other and withdrawing arm 14 through slot 72. Bag 12 may be just as quickly and easily replaced by inserting upper section 54 of arm 14 through slot 72, and by attaching straps 16 to support column 22, as previously described. Bracket 18 remains in position on wire frame sections 80 during the time that bag 12 is removed and used at a position remote from the bicycle.

Typically, straps 16 are sewn onto the fabric of bag 12. Arm 14 and bar 60 can be formed of any suitable metal or other strong, rigid material. Bag 12 may be formed of any suitable, lightweight fabric material, such as nylon or canvas, and is constructed by being sewn together in a convention manner. Insert 38 may be formed of any suitable lightweight material, and preferably a rigid plastic is used. A preferred material is 90/1000ths inch thick polyethylene.

The above described article carrier 10 weighs very little, because it formed primarily of lightweight plastic materials and a lightweight fabric. However, because of the provision of insert 38, bag 12 has a sufficient degree of rigidity to prevent excessive sagging thereof and a sufficient degree of strength to carry relatively heavy articles. The strength is also enhanced by the provision of bar 60. The bag is quickly and easily removable, yet it is secured firmly in place during use and does not interfere with the movements of the bicycle or rider.

In view of the above description, it is likely that modifications and improvements will occur to those skilled in the art which are within the scope of this invention. The above description is intended as exemplary only, and the scope of the invention is defined by the following claims and their equivalents.

What is claimed is:

1. An article carrier for attachment to the underside of a seat of a cycle comprising:
    an enclosed bag having an access opening, an upper wall and a lower wall;
    a bracket having a slot;
    means for securing said bracket to the underside of a cycle seat;
    cantilevered means for removably suspending said bag from said bracket, said cantilevered means comprising an arm connected at a lower end to the upper wall of said bag, said arm having an upper end extending through the slot in said bracket and resting in contact with the underside of the cycle seat, said arm being in freely sliding relation with said bracket; and
    means for removably securing said bag to a support column for the cycle seat, said removably securing means and the weight of said bag applying a torque to the lower end of said arm about the slot in said bracket to urge said free upper end of said arm against the underside of the cycle seat.

2. The article carrier of claim 1 wherein said free upper end of said arm and said lower end of said arm both form an obtuse angle with respect to a central portion of said arm.

3. The article carrier of claim 1 further comprising a support bar disposed on an inside surface of the upper wall of said bag, said lower end of said arm, said support bar and the upper wall of said bag being secured together by fasteners.

4. The article carrier of claim 1 further comprising a generally rigid insert for defining and maintaining the shape of said bag.

5. The article carrier of claim 4 wherein said insert comprises an upper wall adjacent the upper wall of said bag, a lower wall adjacent the lower wall of said bag, and a rear wall disposed on an opposite side of said bag from said access opening having hinge means formed thereon.

6. The article carrier of claim 5 wherein said hinge means comprises a plurality of perforations for permitting the material of the insert to be deformed thereabout.

7. The article carrier of claim 4 wherein said insert biases said upper wall and said lower wall of said bag apart at said access opening and inhibits separation of said upper wall and said lower wall of said bag beyond a predetermined distance.

8. The article carrier of claim 1 wherein said securing means comprises a pair of straps having mating hook and loop fasteners disposed thereon.

9. The article carrier of claim 1 wherein the upper wall and the lower wall of said bag have a generally trapezoidal shape.

10. The article carrier of claim 5 wherein said upper and lower walls of said insert have ends spaced from said hinge means which extend into pockets disposed in said bag.

11. The article carrier of claim 4 wherein said insert is secured to said cantilevered means.

12. An article carrier for attachment to the underside of a bicyle seat, the bicycle seat having a lower surface, two spaced, somewhat parallel wire frame sections spaced from the lower surface of the seat, and a support column, said article carrier comprising:

an enclosed bag having an access opening along a front wall, a rear wall, an upper wall, and a lower wall;

closure means associated with said access opening along said front wall;

a generally rigid insert formed of a continuous sheet of plastic for maintaining and defining the shape of said bag, said insert having an upper wall, a lower wall, and a rear wall;

hinge means disposed along said rear wall of said insert, said insert biasing said upper wall away from said insert lower wall at said front wall of said bag, said insert inhibiting separation of said insert upper and lower walls beyond a predetermined amount;

a bracket for attachment to the wire frame sections of the bicycle seat, said bracket having a slot disposed adjacent the center thereof;

an arm secured at a lower end to said upper wall of said bag, said arm having a middle portion passing through the slot in said bracket and an upper end for resting in contact with the lower surface of the bicycle seat; and means for releasably connecting said rear wall of said bag to a support column for the bicycle seat.

13. The article carrier of claim 12 wherein said hinge means comprise a plurality of perforations.

* * * * *